United States Patent Office 3,419,579
Patented Dec. 31, 1968

3,419,579
SYNTHESIS OF 2,3-DIHYDRO-2,2-DIMETHYL-
7-BENZOFURANOL
Donald L. Towns, Trenton, N.J., assignor to FMC Corporation, New York, N.Y., a corporation of Delaware
No Drawing. Filed Feb. 23, 1966, Ser. No. 529,268
10 Claims. (Cl. 260—346.2)

ABSTRACT OF THE DISCLOSURE

This specification discloses a process for the synthesis of 2,3 - dihydro-2,2-dimethyl-7-benzofuranol comprising:
(a) Reacting 2-hydroxyacetophenone with a methallyl halide to form 2-acetylphenyl methallyl ether,
(b) Rearranging and cyclizing 2-acetylphenyl methallyl ether to form 2,3 - dihydro-2,2-dimethyl-7-acetylbenzofuran,
(c) Oxidizing 2,3-dihydro-2,2-dimethyl-7-acetylbenzofuran to 2,3 - dihydro-2,2-dimethyl-7-acetoxybenzofuran, and
(d) Hydrolyzing 2,3 - dihydro-2,2-dimethyl-7-acetoxybenzofuran to 2,3 - dihydro-2,2-dimethyl-7-benzofuranol.

---

This invention relates to a novel method for the preparation of 2,3 - dihydro-2,2-dimethyl-7-benzofuranol, and more particularly to a method of preparing said compound by a reaction sequence starting with 2-hydroxyacetophenone.

2,3 - dihydro-2,2-dimethyl-7-benzofuranol is the precursor of the insecticidal compound 2,3 - dihydro-2,2-dimethyl-7-benzofuranyl N-methylcarbamate, described in United States patent application Ser. No. 339,612, filed Jan. 23, 1964. As described in U.S. Patent No. 2,362,479, 2,3-dihydro-2,2-dimethyl-7-benzofuranol can be prepared from catechol by first reacting catechol with methallyl chloride to form 2-methallyloxyphenol, which is then rearranged and cyclized to form 2,3-dihydro-2,2-dimethyl-7-benzofuranol. This process results in the formation of the desired compound in reasonably good yield, but is uneconomical primarily because of the relatively high cost of catechol as the starting material.

By the process of the present invention, 2,3-dihydro-2,2 - dimethyl-7-benzofuranol may be prepared in high yields and in relative purity from relatively inexpensive starting materials. This novel reaction sequence comprises the steps of (a) reacting 2-hydroxyacetophenone with a methallyl halide to form the corresponding 2-acetylphenyl methallyl ether, (b) rearranging and cyclizing, in one or two steps, 2-acetylphenyl methallyl ether to form 2,3-dihydro - 2,2-dimethyl-7-acetylbenzofuran, (c) oxidizing 2,3-dihydro-2,2-dimethyl-7-acetylbenzofuran to form 2,3-dihydro - 2,2 - dimethyl-7-acetoxybenzofuran, and (d) hydrolyzing the acetoxy group to form 2,3-dihydro-2,2-dimethyl-7-benzofuranol. In spite of the fact that none of the above reactions is specifically known in the prior art, and that it is not obvious that several of these reactions can be carried out, it has been found that excellent overall yields can be obtained, substantially improved over the yields available from catechol as the starting material.

The 2-hydroxyacetophenone which is used in the first step of this reaction sequence is a known compound. The 2-acetylphenyl methallyl ether is prepared by heating the 2-hydroxyacetophenone with a methallyl halide in the presence of an acid acceptor, in accordance with the equation:

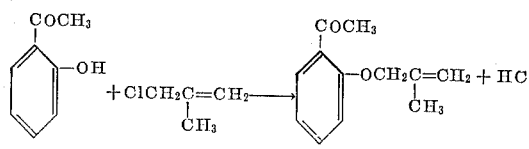

Suitable acid acceptors for use in this step 1 include the alkali metal hydroxides and carbonates. Although methallyl bromide and iodide are more reactive, methallyl chloride is preferred for economic reasons. The reaction proceeds by way of the phenol salt and, if desired, the phenol salt may be preformed by reaction of 2-hydroxyacetophenone with a base, such as an alkali metal hydroxide or carbonate, prior to reaction with the methallyl halide. The etherification reaction is carried out at elevated temperatures, and may conveniently be conducted at the atmospheric boiling point of the mixture or at superatmospheric pressures, or at temperatures up to about 150° C. or higher. Organic solvents such as methanol, dioxane, and dimethylformamide may be used in the preparation of 2-methallyloxyacetophenone, as well as low molecular weight ketones such as acetone or methyl ethyl ketone; or the reaction may advantageously be carried out in aqueous medium, in a heterogeneous reaction system.

2-methallyloxyacetophenone can be caused to rearrange and to cyclize, either in separate steps or in essentially one step, by heating at elevated temperatures to effect the rearrangement and cyclization. If a catalyst is present, particularly for the cyclization, this reaction occurs at substantially lower temperatures, the reaction temperature depending on the catalyst selected. The overall reaction occurs in accordance with the following equations:

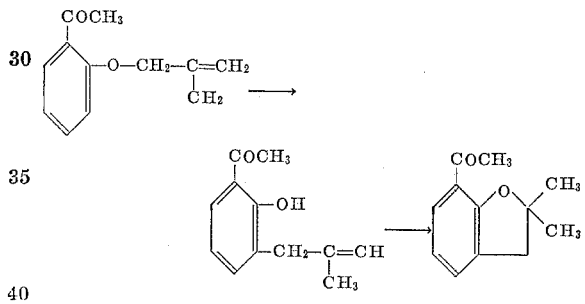

The rearrangement reaction is readily carried out at temperatures in the range of about 150–250° C., with a preferred temperature range of about 175°–200° C. At temperatures substantially higher than about 250° C., degradation of these organic compounds may occur; and at temperatures substantially lower than about 150° C., the rearrangement reaction rate is too slow for convenient operation. The cyclization reaction occurs virtually simultaneously with the rearrangement reaction, in the higher temperature range. In the lower range, the intermediate 2-hydroxy-3-methallylacetophenone may be isolated, and then cyclized with or without a catalyst, at temperatures ranging from about 75° or lower in the presence of suitable catalysts, to an upper temperature limit of about 250° C., when degradation of the product may start. These reactions may be carried out at atmospheric pressure or, alternatively, at partially reduced pressure so that the reactants and reaction products reflux at a somewhat lower reaction temperature. Although solvents of desired boiling ranges such as o-dichlorobenzene may be used, they are not necessary and it is preferred to operate without a solvent.

In general, a catalyst is helpful to effect cyclization to form the dihydrobenzofuran derivative. Effective catalysts include acidic materials such as pyridine hydrochloride, phosphoric acid, formic acid, ferric chloride and magnesium chloride. Excellent results have been obtained with catalysts such as ferric chloride and magnesium chloride, at levels of 0.1–10% and preferably about 1% by weight of the methallylphenol. If it is desired to carry out the rearrangement and cyclization steps separately, the catalyst can be omitted during the rearrangement reaction.

Purification of the crude 2,3-dihydro-2,2-dimethyl-7-acetylbenzofuran may be accomplished, by fractional distillation after removal of the catalyst by standard procedures. The crude material, however, is sufficiently pure to be used directly in the next step.

In the next step of the process the 2,3-dihydro-2,2-dimethyl-7-acetylbenzofuran is converted to the acetoxy derivative. This is accomplished by treating with an active-oxygen compound in accordance with the equation:

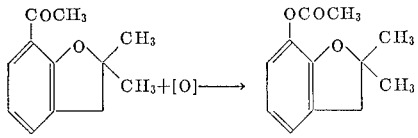

Among suitable active-oxygen compounds for this reaction are peroxides and the per-acids, e.g., hydrogen peroxide, perbenzoic acid or peracetic acid. The reaction is exothermic and is preferably carried out in solvent media unaffected by the oxidizer. Useful solvents include chloroform and carbon tetrachloride. Solvents as diluents, in conjunction with cooling of the reaction vessel, have proven adequate for controlling the reaction.

The final hydrolysis step is carried out in accordance with the equation:

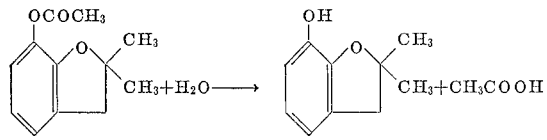

Standard hydrolysis procedures may be utilized, such as hydrolysis with a strong base at elevated temperatures. The hydrolysis may be carried out in aqueous alkali, if desired in the presence of an alkanol. Moderate heat is useful to maintain the reaction. Upon completion of the hydrolysis, the reaction medium may be concentrated by distillation of the alkanol and some of the water. The concentrate may be washed with organic solvent, the residual aqueous solution neutralized with acid, and the product extracted with an organic solvent. The 2,3-dihydro-2,2-dimethyl-7-benzofuranol may be purified by distillation under reduced pressure.

The process of this invention is illustrated by the following examples. The examples are a specific embodiment and are not intended to limit the invention in any way. All art recognized materials and conditions equivalent to those shown are intended to be included within the scope of this invention. All percentages are by weight, and all temperatures in degrees Centigrade.

EXAMPLE 1

Preparation of 2-acetylphenyl methallyl ether 2-hydroxyacetophenone (27.2 g.), methallyl chloride (20 g.) and sodium hydroxide (8 g.) were dissolved in methyl alcohol (60 cc.) and the reaction mixture was refluxed for 8 hours. The mixture was cooled and the salt was removed by filtration. The solvent was removed under vacuum and the residue was dissolved in chloroform (200 ml.). The resulting solution was washed with two 200 ml. portions of 5% sodium hydroxide and two 100 ml. portions of water. The chloroform was removed under vacuum to give 28.0 g. of crude 2-acetylphenyl methallyl ether. A portion of this ether was distilled under vacuum at 2.2 mm. (B.P. 120–125°). The structure was confirmed by NMR analysis.

Analysis calculated for $C_{12}H_{14}O_2$: C, 75.7; H, 7.4. Found: C, 75.58; H, 7.40.

EXAMPLE 2

Preparation of 2,3-dihydro-2,2-dimethyl-7-acetylbenzofuran 2-acetylphenyl methallyl ether (343 g.) and anhydrous magnesium chloride (10 g.) were heated at 190–200° C. for 5 hours. The mixture was distilled at 0.3 mm. (B.P. 90–100°). The distillate was dissolved in chloroform, washed with 5% sodium hydroxide and water. The solvent was removed on a hot plate and the crude residue recrystallized from pentane. The desired 2,3-dihydro-2,2-dimethyl-7-acetylbenzofuran (105 g.) melted at 44–45°. The structure was confirmed by NMR.

Analysis calculated for $C_{12}H_{14}O_2$: C, 75.7; H, 7.4. Found: C, 75.61; H, 7.52.

EXAMPLE 3

Preparation of 2,3-dihydro-2,2-dimethyl-7-acetoxybenzofuran 2,3 - dihydro-2,2-dimethyl-7-acetylbenzofuran (48 g.) was dissolved in 1 liter of chloroform. To this was added 78 ml. of 31% peracetic acid in acetic acid. The reaction mixture was stirred at room temperature for 3 days. Gas chromatography showed that 87% of the starting material had been converted to 2,3-dihydro-2,2-dimethyl-7-acetoxybenzofuran.

EXAMPLE 4

Preparation of 2,3-dihydro-2,2-dimethyl-7-benzofuranol

The solution of 2,3-dihydro-2,2-dimethyl - 7 - acetoxybenzofuran in chloroform, obtained in Example 3, was the starting material. The solvent was removed under vacuum, 20 g. of sodium hydroxide dissolved in 250 ml. of water and 25 ml. of ethanol were added, and the mixture was refluxed for 2.5 hours. Fifty ml. of ethanol-water were removed by distillation and, after cooling, the mixture was neutralized with hydrochloric acid and extracted with three 30 ml. portions of chloroform. After concentrating under vacuum, the residue was distilled at 0.3 mm. pressure. The first fraction (29 g.) had a boiling point of 79–90°, and the second fraction (1.6 g.) had a boiling point of 90–110°. NMR analysis showed the first fraction to be 90% 2,3-dihydro-2,2-dimethyl-7-benzofuranol.

As will be apparent to those skilled in the art, numerous modifications and variations of the embodiments illustrated above may be made without departing from the spirit of the invention or the scope of the following claims.

What is claimed is:

1. The process of preparing 2,3-dihydro-2,2-dimethyl-7-benzofuranol which comprises:
    (a) reacting 2-hydroxyacetophenone with a methallyl halide to form 2-acetylphenyl methallyl ether,
    (b) rearranging and cyclizing 2-acetylphenyl methallyl ether to form 2,3-dihydro-2,2-dimethyl-7-acetylbenzofuran,
    (c) oxidizing 2,3 - dihydro-2,2-dimethyl-7-acetylbenzofuran to 2,3-dihydro - 2,2 - dimethyl-7-acetoxybenzofuran, and
    (d) hydrolyzing 2,3-dihydro - 2,2 - dimethyl-7-acetoxybenzofuran to 2,3 - dihydro - 2,2 - dimethyl-7-benzofuranol.

2. The process of claim 1 wherein reaction (a) is carried out at reflux temperatures in an aqueous alkali.

3. The process of claim 1 wherein the rearrangement and cyclization reactions (b) are achieved in one step.

4. The process of claim 1 wherein the rearrangement and cyclization reactions (b) are achieved in two separate and successive steps.

5. The process of claim 3 wherein the rearrangement and cyclization are accomplished by heating 2-acetylphenyl methallyl ether in the presence of an acid catalyst.

6. The process of claim 4 wherein the rearrangement step is accomplished by heating 2-acetylphenyl methallyl ether to temperatures in the range of 150–250° C. to form 2-hydroxy-3-methallylacetophenone.

7. The process of claim 4 wherein the cyclization is accomplished by heating 2-hydroxy-3-methallylacetophenone in the presence of an acid catalyst.

8. The process of claim 1 wherein the rearrangement and cyclization are carried out at temperatures in the range of 175–200° C.

9. The process of claim 1 wherein the oxidation (c) is performed under acidic conditions by an active oxygen compound.

10. The process of claim 9 wherein the active oxygen compound is peracetic acid.

References Cited

UNITED STATES PATENTS 3,356,690   12/1967   Orwoll _____ 260—346.2

OTHER REFERENCES

Fieser and Fieser—Advanced Organic Chem., N.Y., Reinhold (1961), pp. 427–29.

Cram and Hammond—Organic Chem., N.Y., McGraw-Hill (1959), pp. 474–5.

NICHOLAS S. RIZZO, *Primary Examiner.*

B. I. DENTZ, *Assistant Examiner.*

U.S. Cl. X.R.

260—551